(12) United States Patent
Doctor et al.

(10) Patent No.: US 10,944,811 B2
(45) Date of Patent: Mar. 9, 2021

(54) HYBRID CLOUD NETWORK MONITORING SYSTEM FOR TENANT USE

(71) Applicant: VMware, Inc., Palo Alto, CA (US)

(72) Inventors: Brad Doctor, Broomfield, CO (US); Matt Probst, Orem, UT (US)

(73) Assignee: VMware, Inc., Palo Alto, CA (US)

( * ) Notice: Subject to any disclaimer, the term of this patent is extended or adjusted under 35 U.S.C. 154(b) by 46 days.

(21) Appl. No.: 15/846,133

(22) Filed: Dec. 18, 2017

(65) Prior Publication Data

US 2018/0109602 A1 Apr. 19, 2018

Related U.S. Application Data

(63) Continuation of application No. 14/579,911, filed on Dec. 22, 2014, now Pat. No. 9,860,309.

(51) Int. Cl.
| | |
|---|---|
| *H04L 29/08* | (2006.01) |
| *H04L 12/46* | (2006.01) |
| *H04L 12/26* | (2006.01) |

(52) U.S. Cl.
CPC .......... *H04L 67/10* (2013.01); *H04L 12/4633* (2013.01); *H04L 43/062* (2013.01); *H04L 43/12* (2013.01)

(58) Field of Classification Search
CPC ... H04L 67/10; H04L 12/4633; H04L 43/062; H04L 43/12
USPC ........................................................ 709/224
See application file for complete search history.

(56) References Cited

U.S. PATENT DOCUMENTS

| | | | | |
|---|---|---|---|---|
| 7,899,048 B1 * | 3/2011 | Walker | .................... | H04L 43/18 370/390 |
| 8,547,972 B2 * | 10/2013 | Mahdavi | ................. | G06F 9/455 370/389 |
| 8,645,952 B2 * | 2/2014 | Biswas | ................. | H04L 49/208 718/1 |
| 8,665,747 B2 * | 3/2014 | Elsen | ...................... | H04L 45/18 370/254 |
| 8,879,554 B2 * | 11/2014 | Emmadi | ................. | H04L 49/30 370/389 |
| 8,996,691 B1 * | 3/2015 | Stickle | .............. | H04L 12/40071 709/224 |
| 9,397,960 B2 * | 7/2016 | Arad | ..................... | H04L 49/355 |

(Continued)

*Primary Examiner* — Esther B. Henderson
*Assistant Examiner* — Nazia Naoreen
(74) *Attorney, Agent, or Firm* — Loza & Loza, LLP (57) ABSTRACT

Network traffic in a cloud computing system is monitored in response to a request to capture network traffic of a tenant port of a first virtual machine (VM) executing in the cloud computing system, wherein the first VM is associated with a first tenant organization different from a second organization managing the cloud computing system. A decapsulating VM having a first network interface and a second network interface is instantiated, wherein the decapsulating VM is inaccessible to the first tenant organization. An encapsulated port mirroring session from the tenant port of the first VM to the first network interface of the decapsulating VM is then established. A plurality of packets comprising captured network traffic received via the encapsulated port mirroring session are decapsulated, and the captured network traffic is forwarded via the second network interface of the decapsulating VM to a sniffer VM.

14 Claims, 4 Drawing Sheets

(56) References Cited

U.S. PATENT DOCUMENTS

| | | | |
|---|---|---|---|
| 2014/0185616 A1* | 7/2014 | Bloch | H04L 12/4633 370/392 |
| 2014/0279885 A1* | 9/2014 | Anantharam | H04L 5/0055 707/622 |
| 2015/0139232 A1* | 5/2015 | Yalagandula | G06F 9/45558 370/392 |

* cited by examiner

HYBRID CLOUD NETWORK MONITORING SYSTEM FOR TENANT USE

CROSS-REFERENCE TO RELATED APPLICATIONS

This application claims priority to U.S. application Ser. No. 14/579,911, filed Dec. 22, 2014 (now U.S. Pat. No. 9,860,309), which is incorporated by reference herein in its entirety.

BACKGROUND

Commercial enterprises are frequently turning to public cloud providers to meet their computing needs. The benefits of cloud computing are numerous. Among the benefits are lower operating costs, due to reduced spending on computing hardware, software, and support. In addition, since public clouds are generally accessible from any network-connected device, applications deployed to the cloud are more easily distributed to a diverse and global workforce.

Cloud architectures are used in cloud computing and cloud storage systems for offering infrastructure-as-a-service (IaaS) cloud services. Examples of cloud architectures include the VMware vCloud™ Director cloud architecture software, Amazon EC2™ web service, and OpenStack™ open source cloud computing service. IaaS cloud service is a type of cloud service that provides access to physical and/or virtual resources in a cloud environment. These services provide a tenant application programming interface (API) that supports operations for manipulating IaaS constructs such as virtual machines (VMs) and logical networks. However, the use of such public cloud services is typically kept separate from the use of existing computing resources in data centers managed by an enterprise.

Customers of cloud computing services are often referred to as "tenants," as the customers more or less "rent" computing hardware and software services from the cloud provider. Since a single public cloud can host many clients simultaneously in an isolated manner, public clouds are referred to as multi-tenant computing environments. In order to provide a level of isolation between applications deployed in the cloud by different tenants, cloud providers often provision virtual machines for their tenants. Each tenant virtual machine is capable of executing one or more client applications. The tenant virtual machine runs on top of a virtualized computing platform provided by the cloud, and, using the virtualized computing platform, communicates with other cloud tenants, as well as with external entities outside of the cloud. The tenant virtual machine is designed to give the individual tenant a reasonable level of control over computing services provided by the tenant, without having an undue effect on other tenants.

Among the tasks that tenants seek to perform is the monitoring of network traffic that is transmitted to and from virtual machines managed by a tenant and that may be executing virtual workloads. Monitoring network traffic enables tenant organizations to, for example, troubleshoot problems with that virtual machine, gauge future capacity requirements, or to track down the source of malicious network requests (such as those experienced in a denial of service attack on the tenant virtual machine). However, there are challenges to using traffic monitoring devices (often referred to as network "sniffers") in a cloud computing system. Sniffer applications rely on special access to low level network interfaces and network configuration data, which cloud computing systems typically abstract or hide from tenant organizations.

SUMMARY

In one embodiment, a method for monitoring network traffic in a cloud computing system is provide. The method comprises receiving a request to capture network traffic of a tenant port of a first virtual machine (VM) executing in the cloud computing system, wherein the first VM is associated with a first tenant organization different from a second organization managing the cloud computing system. The method further comprises instantiating a decapsulating VM having a first network interface and a second network interface, wherein the decapsulating VM is inaccessible to the first tenant organization. The method further comprises establishing an encapsulated port mirroring session from the tenant port of the first VM to the first network interface of the decapsulating VM, and decapsulating, by execution of the decapsulating VM, a plurality of packets comprising captured network traffic received via the encapsulated port mirroring session. The method further comprises forwarding the captured network traffic via the second network interface of the decapsulating VM to a sniffer VM.

Further embodiments provide a non-transitory computer-readable medium that includes instructions that, when executed, enable one or more computer hosts to implement one or more aspects of the above method, and a cloud-based computing system that includes one or more computer hosts programmed to implement one or more aspects of the above method.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
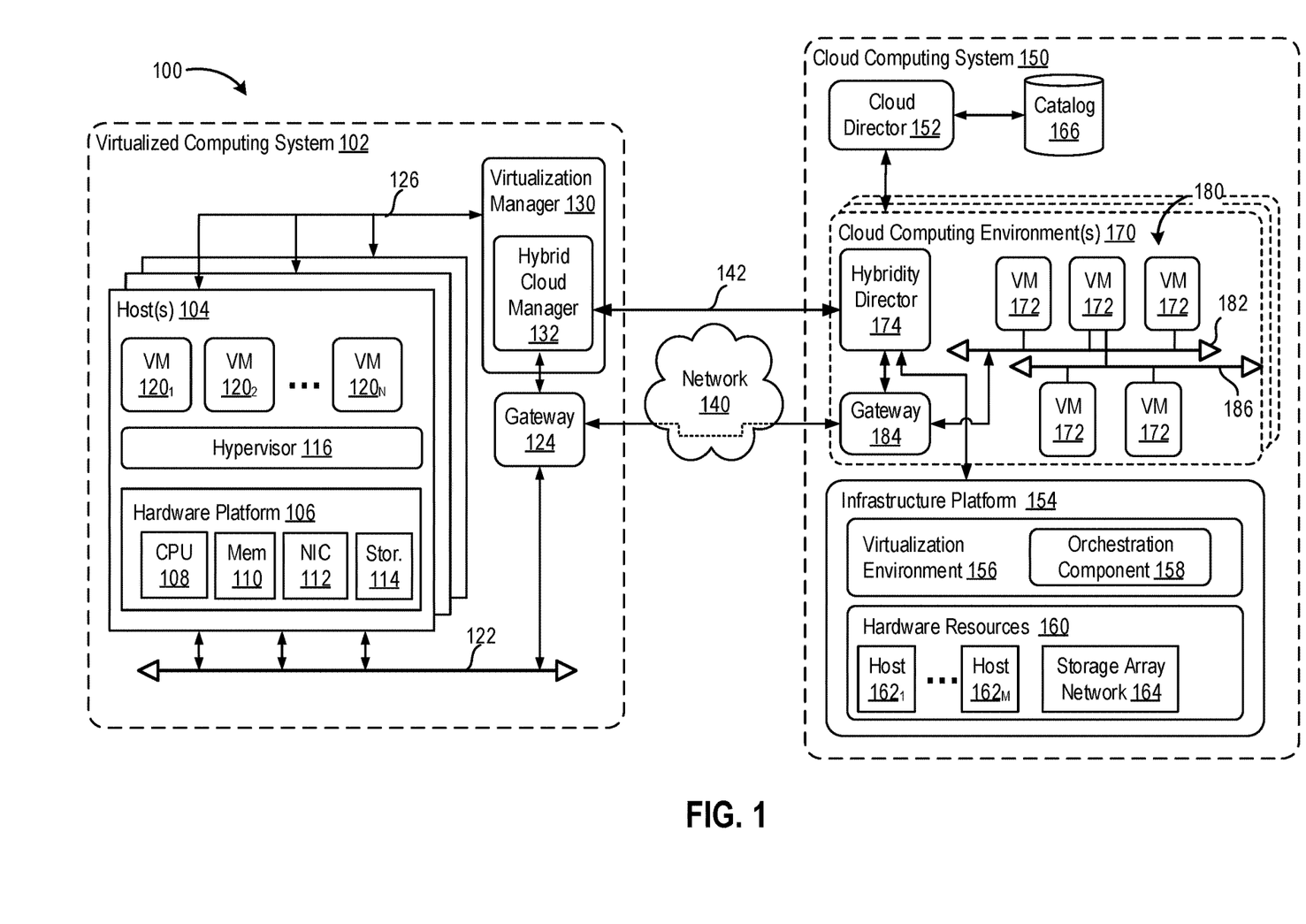
FIG. 1 is a block diagram of a hybrid cloud computing system in which one or more embodiments of the present disclosure may be utilized.

FIG. 1 is a block diagram of a hybrid cloud computing system 100 in which one or more embodiments of the present disclosure may be utilized. Hybrid cloud computing system 100 includes a virtualized computing system 102 and a cloud computing system 150, and is configured to provide a common platform for managing and executing virtual workloads seamlessly between virtualized computing system 102 and cloud computing system 150. In one embodiment, virtualized computing system 102 may be a data center controlled and administrated by a particular enterprise or business organization, while cloud computing system 150 is operated by a cloud computing service provider and exposed as a service available to account holders, such as the particular enterprise in addition to other enterprises. As such, virtualized computing system 102 may sometimes be referred to as an on-premise data center(s), and cloud computing system 150 may be referred to as a "public" cloud service. In some embodiments, virtualized computing system 102 itself may be configured as a private cloud service provided by the enterprise.

As used herein, an internal cloud or "private" cloud is a cloud in which a tenant and a cloud service provider are part of the same organization, while an external or "public" cloud is a cloud that is provided by an organization that is separate from a tenant that accesses the external cloud. For example, the tenant may be part of an enterprise, and the external cloud may be part of a cloud service provider that is separate from the enterprise of the tenant and that provides cloud services to different enterprises and/or individuals. In embodiments disclosed herein, a hybrid cloud is a cloud architecture in which a tenant is provided with seamless access to both private cloud resources and public cloud resources.

Virtualized computing system 102 includes one or more host computer systems 104. Hosts 104 may be constructed on a server grade hardware platform 106, such as an x86 architecture platform, a desktop, and a laptop. As shown, hardware platform 106 of each host 104 may include conventional components of a computing device, such as one or more processors (CPUs) 108, system memory 110, a network interface 112, storage 114, and other I/O devices such as, for example, a mouse and keyboard (not shown). Processor 108 is configured to execute instructions, for example, executable instructions that perform one or more operations described herein and may be stored in memory 110 and in local storage. Memory 110 is a device allowing information, such as executable instructions, cryptographic keys, virtual disks, configurations, and other data, to be stored and retrieved. Memory 110 may include, for example, one or more random access memory (RAM) modules. Network interface 112 enables host 104 to communicate with another device via a communication medium, such as a network 122 within virtualized computing system 102. Network interface 112 may be one or more network adapters, also referred to as a Network Interface Card (NIC). Storage 114 represents local storage devices (e.g., one or more hard disks, flash memory modules, solid state disks, and optical disks) and/or a storage interface that enables host 104 to communicate with one or more network data storage systems. Examples of a storage interface are a host bus adapter (HBA) that couples host 104 to one or more storage arrays, such as a storage area network (SAN) or a network-attached storage (NAS), as well as other network data storage systems.

Each host 104 is configured to provide a virtualization layer that abstracts processor, memory, storage, and networking resources of hardware platform 106 into multiple virtual machines $120_1$ to $120_N$ (collectively referred to as VMs 120) that run concurrently on the same hosts. VMs 120 run on top of a software interface layer, referred to herein as a hypervisor 116, that enables sharing of the hardware resources of host 104 by VMs 120. One example of hypervisor 116 that may be used in an embodiment described herein is a VMware ESXi hypervisor provided as part of the VMware vSphere solution made commercially available from VMware, Inc. Hypervisor 116 may run on top of the operating system of host 104 or directly on hardware components of host 104.

Virtualized computing system 102 includes a virtualization management module (depicted in FIG. 1 as virtualization manager 130) that may communicate to the plurality of hosts 104 via a network, sometimes referred to as a management network 126. In one embodiment, virtualization manager 130 is a computer program that resides and executes in a central server, which may reside in virtualized computing system 102, or alternatively, running as a VM in one of hosts 104. One example of a virtualization management module is the vCenter® Server product made available from VMware, Inc. Virtualization manager 130 is configured to carry out administrative tasks for virtualized computing system 102, including managing hosts 104, managing VMs 120 running within each host 104, provisioning VMs, migrating VMs from one host to another host, and load balancing between hosts 104.

In one embodiment, virtualization manager 130 includes a hybrid cloud management module (depicted as hybrid cloud manager 132) configured to manage and integrate virtualized computing resources provided by cloud computing system 150 with virtualized computing resources of virtualized computing system 102 to form a unified "hybrid" computing platform. Hybrid cloud manager 132 is configured to deploy VMs in cloud computing system 150, transfer VMs from virtualized computing system 102 to cloud computing system 150, and perform other "cross-cloud" administrative task, as described in greater detail later. In one implementation, hybrid cloud manager 132 is a module or plug-in complement to virtualization manager 130, although other implementations may be used, such as a separate computer program executing in a central server or running in a VM in one of hosts 104.

In one embodiment, hybrid cloud manager 132 is configured to control network traffic into network 122 via a gateway component (depicted as a gateway 124). Gateway 124 (e.g., executing as a virtual appliance) is configured to provide VMs 120 and other components in virtualized computing system 102 with connectivity to an external network 140 (e.g., Internet). Gateway 124 may manage external public IP addresses for VMs 120 and route traffic incoming to and outgoing from virtualized computing system 102 and provide networking services, such as firewalls, network address translation (NAT), dynamic host configuration protocol (DHCP), load balancing, and virtual private network (VPN) connectivity over a network 140.

In one or more embodiments, cloud computing system 150 is configured to dynamically provide an enterprise (or users of an enterprise) with one or more virtual data centers 180 in which a user may provision VMs 120, deploy multi-tier applications on VMs 120, and/or execute workloads. Cloud computing system 150 includes an infrastructure platform 154 upon which a cloud computing environment 170 may be executed. In the particular embodiment of FIG. 1, infrastructure platform 154 includes hardware resources 160 having computing resources (e.g., hosts $162_1$ to $162_N$), storage resources (e.g., one or more storage array systems, such as SAN 164), and networking resources, which are configured in a manner to provide a virtualization environment 156 that supports the execution of a plurality of virtual machines 172 across hosts 162. It is recognized that hardware resources 160 of cloud computing system 150 may in fact be distributed across multiple data centers in different locations.

Each cloud computing environment 170 is associated with a particular tenant of cloud computing system 150, such as the enterprise providing virtualized computing system 102. In one embodiment, cloud computing environment 170 may be configured as a dedicated cloud service for a single tenant comprised of dedicated hardware resources 160 (i.e., physically isolated from hardware resources used by other users of cloud computing system 150). In other embodiments, cloud computing environment 170 may be configured as part of a multi-tenant cloud service with logically isolated virtualized computing resources on a shared physical infrastructure. As shown in FIG. 1, cloud computing system 150 may support multiple cloud computing environments 170, available to multiple enterprises in single-tenant and multi-tenant configurations.

In one embodiment, virtualization environment 156 includes an orchestration component 158 (e.g., implemented as a process running in a VM) that provides infrastructure resources to cloud computing environment 170 responsive to provisioning requests. For example, if an enterprise required a specified number of virtual machines to deploy a web applications or to modify (e.g., scale) a currently running web application to support peak demands, orchestration component 158 can initiate and manage the instantiation of virtual machines (e.g., VMs 172) on hosts 162 to support such requests. In one embodiment, orchestration component 158 instantiates virtual machines according to a requested template that defines one or more virtual machines having specified virtual computing resources (e.g., compute, networking, storage resources). Further, orchestration component 158 monitors the infrastructure resource consumption levels and requirements of cloud computing environment 170 and provides additional infrastructure resources to cloud computing environment 170 as needed or desired. In one example, similar to virtualized computing system 102, virtualization environment 156 may be implemented by running on hosts 162 VMware ESX™-based hypervisor technologies provided by VMware, Inc. of Palo Alto, Calif. (although it should be recognized that any other virtualization technologies, including Xen® and Microsoft Hyper-V virtualization technologies may be utilized consistent with the teachings herein).

In one embodiment, cloud computing system 150 may include a cloud director 152 (e.g., run in one or more virtual machines) that manages allocation of virtual computing resources to an enterprise for deploying applications. Cloud director 152 may be accessible to users via a REST (Representational State Transfer) API (Application Programming Interface) or any other client-server communication protocol. Cloud director 152 may authenticate connection attempts from the enterprise using credentials issued by the cloud computing provider. Cloud director 152 maintains and publishes a catalog 166 of available virtual machine templates and packaged virtual machine applications that represent virtual machines that may be provisioned in cloud computing environment 170. A virtual machine template is a virtual machine image that is loaded with a pre-installed guest operating system, applications, and data, and is typically used to repeatedly create a VM having the pre-defined configuration. A packaged virtual machine application is a logical container of pre-configured virtual machines having software components and parameters that define operational details of the packaged application. An example of a packaged VM application is vApp™ technology made available by VMware, Inc., of Palo Alto, Calif., although other technologies may be utilized. Cloud director 152 receives provisioning requests submitted (e.g., via REST API calls) and may propagates such requests to orchestration component 158 to instantiate the requested virtual machines (e.g., VMs 172).

In the embodiment of FIG. 1, cloud computing environment 170 supports the creation of a virtual data center 180 having a plurality of virtual machines 172 instantiated to, for example, host deployed multi-tier applications. A virtual data center 180 is a logical construct that provides compute, network, and storage resources to an organization. Virtual data centers 180 provide an environment where VM 172 can be created, stored, and operated, enabling complete abstraction between the consumption of infrastructure service and underlying resources. VMs 172 may be configured similarly to VMs 120, as abstractions of processor, memory, storage, and networking resources of hardware resources 160.

Virtual data center 180 includes one or more virtual networks 182 used to communicate between VMs 172 and managed by at least one networking gateway component (e.g., gateway 184), as well as one or more isolated internal networks 186 not connected to gateway 184. Gateway 184 (e.g., executing as a virtual appliance) is configured to provide VMs 172 and other components in cloud computing environment 170 with connectivity to an external network 140 (e.g., Internet). Gateway 184 manages external public IP addresses for virtual data center 180 and one or more private internal networks interconnecting VMs 172. Gateway 184 is configured to route traffic incoming to and outgoing from virtual data center 180 and provide networking services, such as firewalls, network address translation (NAT), dynamic host configuration protocol (DHCP), and load balancing. Gateway 184 may be configured to provide virtual private network (VPN) connectivity over a network 140 with another VPN endpoint, such as a gateway 124 within virtualized computing system 102. In other embodiments, gateway 184 may be configured to connect to communicate with virtualized computing system 102 using a high-throughput, dedicated link (depicted as a direct connect 142) between virtualized computing system 102 and cloud computing system 150. In one or more embodiments, gateways 124 and 184 are configured to provide a "stretched" layer-2 (L2) network that spans virtualized computing system 102 and virtual data center 180, as shown in FIG. 1.

While FIG. 1 depicts a single connection between on-premise gateway 124 and cloud-side gateway 184 for illustration purposes, it should be recognized that multiple connections between multiple on-premise gateways 124 and cloud-side gateways 184 may be used. Furthermore, while FIG. 1 depicts a single instance of a gateway 184, it is recognized that gateway 184 may represent multiple gateway components within cloud computing system 150. In some embodiments, a separate gateway 184 may be deployed for each virtual data center, or alternatively, for each tenant. In some embodiments, a gateway instance may be deployed that manages traffic with a specific tenant, while a separate gateway instance manages public-facing traffic to the Internet. In yet other embodiments, one or more gateway instances that are shared among all the tenants of cloud computing system 150 may be used to manage all public-facing traffic incoming and outgoing from cloud computing system 150.

In one embodiment, each virtual data center 180 includes a "hybridity" director module (depicted as hybridity director 174) configured to communicate with the corresponding hybrid cloud manager 132 in virtualized computing system 102 to enable a common virtualized computing platform between virtualized computing system 102 and cloud computing system 150. Hybridity director 174 (e.g., executing as a virtual appliance) may communicate with hybrid cloud manager 132 using Internet-based traffic via a VPN tunnel established between gateways 124 and 184, or alternatively, using direct connect 142. In one embodiment, hybridity director 174 may control gateway 184 to control network traffic into virtual data center 180. In some embodiments, hybridity director 174 may control VMs 172 and hosts 162 of cloud computing system 150 via infrastructure platform 154.

As previously mentioned, network monitoring presents challenges in cloud-computing environments. First, some known approaches to network monitoring may be unsuitable due to the underlying infrastructure of cloud computing system 150. For example, one known approach to network monitoring which requires a (source) port being monitored to be on the same physical host as a destination port doing the monitoring would be impractical for cloud computing systems configured to dynamically and automatically migrate VMs between physical hosts. Second, a tenant organization may not have access to the management layer(s) or the physical hardware of cloud computing system 150. Accordingly, embodiments of the present disclosure provide a technique for monitoring VM traffic in a public cloud computing system context, which has an underlying network architecture configured to maintain data privacy amongst tenant VMs.

Figure 2:
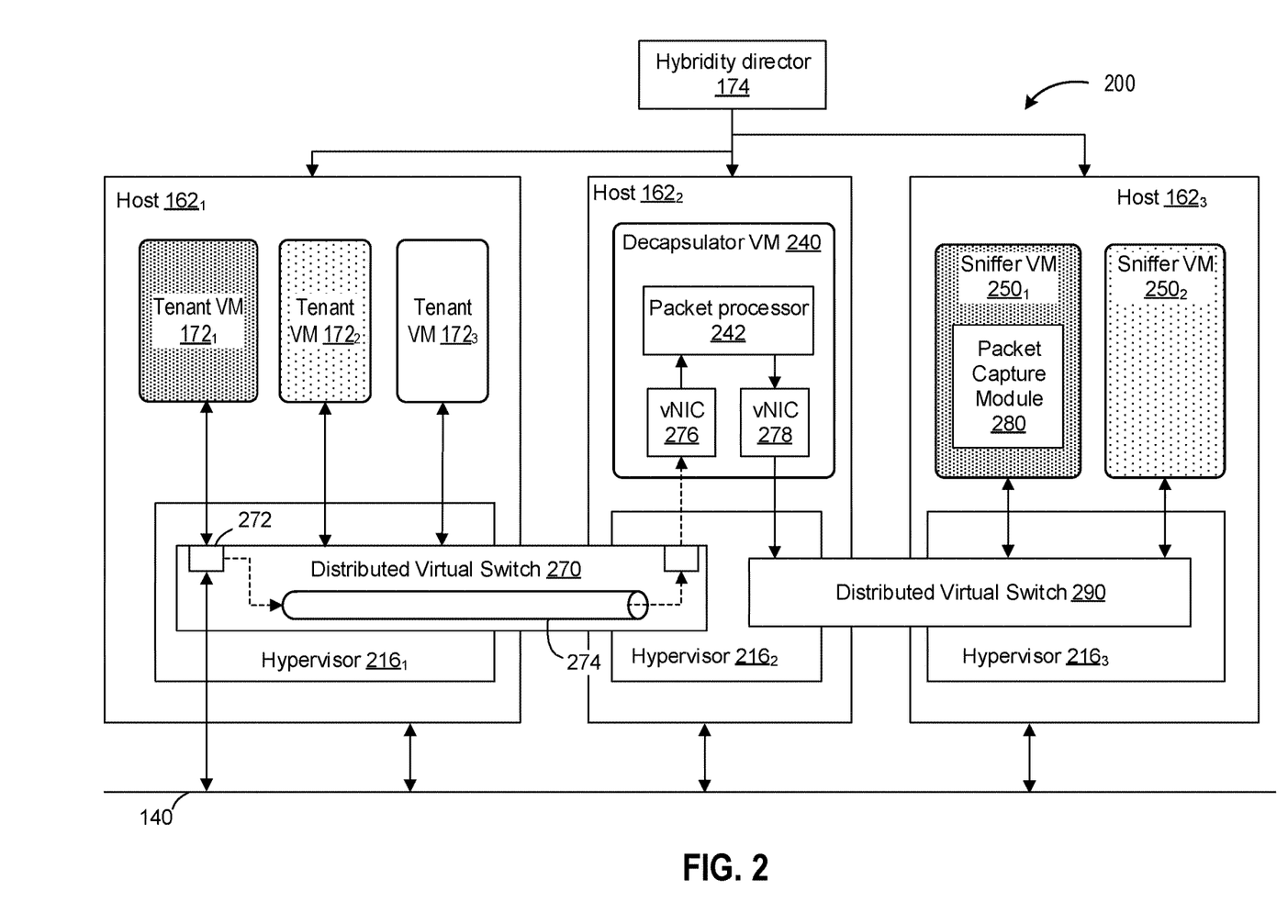
FIG. 2 is a block diagram depicting a public cloud-based computing system, according to one or more embodiments.

FIG. 2 is a block diagram that illustrates a public cloud-based computing system 200 having a virtual sniffer deployed therein to monitor network traffic for cloud tenants, according to embodiments. In one embodiment, cloud-based computing system 200 may be similar to, and/or include, one or more components of cloud computing system 150, depicted in FIG. 1. As shown, cloud-based computing system 200 includes a plurality of multiple host computers 162. In the embodiment shown in FIG. 2, cloud-based computing system 200 includes at least three host computers, hosts $162_{1-3}$. For simplicity of illustration, hardware platforms of each host including physical network interface controllers have been omitted.

Hypervisors 216 (similar to hypervisors 116 depicted in FIG. 1) are software modules that execute on corresponding hosts 162, and that support the execution of one or more virtual machines (VMs) on the corresponding host 162. Each of hypervisors $216_{1-3}$ provides the VMs with a virtual hardware platform, and manages the execution of guest operating systems therein. Examples of hypervisors include ESX®, available from VMware, Inc., and Hyper-V®, available from Microsoft Corporation.

Public cloud-based computing system 200 includes one or more tenants VMs (depicted as VMs $172_{1-3}$) managed by a respective tenant organization. Tenants VM $172_1$, $172_2$, and $172_3$ may be deployed for, managed by, and/or associated with a different tenant organization, as depicted by different fill patterns in FIG. 2. Thus, tenant VM $172_1$ is deployed to cloud-based computing system 200 for a first tenant organization, tenant VM $172_2$ is deployed for a second end user, and so on. Each tenant VM $172_{1-3}$ executes independently with respect to each of the other (co-tenant) VMs. Indeed, the tenant VMs may be deployed for various reasons, depending on the needs of the corresponding end user. For example, tenant VM $172_1$ may be deployed as a cloud-based database server, while tenant VM $172_2$ may be deployed as an online transaction server. It should be noted that hypervisor $216_1$ executes each of the tenant VMs 172 in such a way as to isolate the VMs from each other.

Among the virtual hardware components that hypervisor $216_1$ provides for tenant VMs $172_{1-3}$ is networking capability. This networking capability is provided by a distributed virtual switch 270, which is a software emulation of a physical network switch. Distributed virtual switch 270 is comprised, in embodiments, of separate individual virtual switches, each of which exists on a corresponding host 162. Hypervisors $216_1$ and $216_2$ jointly manage the ports allocated to distributed virtual switch 270. As shown in FIG. 2, each of tenant VMs $172_{1-3}$ connects to distributed virtual switch 270. Each tenant VM 172 includes one or more virtual NICs, which emulate a physical network adapter for the corresponding VM. Each virtual NIC (or VNIC) transmits and receives packets to and from distributed virtual switch 270. Each tenant VM 172 communicates with distributed virtual switch 270 by connecting to a virtual port. For example, tenant VM $172_1$ is communicatively connected to a virtual port 272 of distributed virtual switch 270 (sometimes referred to as a "tenant port"). When a source tenant VM 172 (e.g., tenant VM $172_1$) transmits a data packet to a remote destination, the source tenant VM $172_1$ addresses the data packet (by appropriately updating a packet header) and transmits the data packet (via a corresponding virtual NIC) to distributed virtual switch 270.

In one or more embodiments, distributed virtual switch 270 is configured to establish a port mirroring session that sends traffic of a particular network interface to an application that analyzes network traffic. The port mirroring session copies packets (ingress, egress, or both) at a "source" port and sends the copies of the packets to a "destination" port for analysis. In one particular embodiment, the port mirroring session may be an Encapsulated Remote Switched Port Analyzer (ERSPAN) configured to encapsulate the copied packets using a generic routing encapsulation (GRE), which allows the copied packets to be transported across Layer 3 domains. In the embodiment shown in FIG. 2, distributed virtual switch 270 is configured to establish a port mirroring session that monitors traffic of a tenant VM $172_1$ at tenant port 272 to which the tenant VM is communicatively connected. Upon receiving network traffic entering or exiting tenant port 272, distributed virtual switch 270 copies the network traffic of tenant port 272, encapsulates the copied packets (as depicted by tunnel 274) for transport across Layer 3 domains, and sends the monitored traffic to one or more destination ports. According to embodiments, tunnel 274 is a generic encapsulating tunnel that supports point-to-point transmission of data that is encapsulated in a way that is recognized by tunnel nodes. According to embodiments, tunnel 274 is configured to route network traffic for a tenant VM to a corresponding sniffer VM by way of decapsulator VM 240. The process of encapsulation is described in further detail below, in connection with FIG. 3. The description of monitoring network traffic of a first tenant VM $172_1$ is described in detail for exemplary purposes, and it should be noted traffic of the other tenant VMs may be performed similarly.

Due to the limitations of port mirroring, the monitored traffic may not be able to be directly sent to a tenant-managed traffic analyzer module. For example, establishment of a port mirroring session may require a specified, reachable IP address be designated as a destination, as well as traffic be sent from a physical host, neither of which are exposed to a tenant organization by design of the cloud computing system's network architecture. Accordingly, embodiments of the present disclosure provide a "decapsulator" VM that acts as an intermediary between a port mirroring session and a tenant-managed network analyzer module.

In one or more embodiments, public cloud-based computing system 200 includes at least one decapsulator VM 240 configured to facilitate the monitoring of network traffic on tenant ports (e.g., tenant port 272) by a tenant-managed sniffer VM. Decapsulator VM 240 executes independently of the tenant VMs and is generally inaccessible and/or invisible to tenant organizations and associated tenants VMs. In the embodiment shown, decapsulator VM 240 is executing on a different host (e.g., host 162$_2$) from the host (e.g., host 162$_1$) on which tenant 172 VMs executing. In some embodiments, host 162$_2$ executing the decapsulator VM may also be hidden from tenants.

In one embodiment, decapsulator VM 240 includes at least two virtual network interfaces 276 and 278. A first virtual network interface (vNIC) 276 is assigned a network address (e.g., IP address) and is communicatively connected to distributed virtual switch 270. The first virtual network interface is configured to receive (via tunnel 274) data packets of a port mirroring session from distributed virtual switch 270. That is, the port mirroring session is established designating the network address of first virtual network interface 276 as the destination port. A second virtual network interface 278 may not be assigned a network address and is communicatively connected to a second distributed virtual switch 290 that is shared with tenant sniffer VM(s) 250, described later. In one embodiment, second virtual network interface 278 is configured for unidirectional Layer 2 physical unicast traffic.

Decapsulator VM 240 includes a packet processor 242 configured to decapsulate the data packets encapsulated by tunnel 274 and to transmit the decapsulated data packets to the correct corresponding sniffer VM. Packet processor 242 may be any software module, script, user-level application, or kernel-level daemon executing within decapsulator VM 240 configured to perform the functionality described herein. In one embodiment, decapsulator VM 240 may use a kernel-level firewall to read packets received on virtual network interface 272 into packet processor 242, which decapsulates the received data packets, updates the packet headers (as described below) in order to route the packets to the correct destination sniffer VM, and then transmits the updated data packet over the second virtual network interface 278. In one implementation, decapsulator VM 240 may leverage the iptables application made available by NetFilter, having a target designated as "NFQUEUE" to read packets into packet processor 242, which strips the header wrapper (of tunnel 274) from the packets, re-writes the destination MAC address of the correct sniffer VM, and places the L2 data packet on the wire destined for the tenant's sniffer VM.

According to embodiments, a tenant VM may be configured to be monitored, which results in the instantiation, in cloud-based computing system 200 (which is a public cloud), a tenant "sniffer" (or sniffer VM). A sniffer VM 250 is a virtual machine that executes a packet analyzer program that is configured to capture packets, decode the content of the packets, and to analyze this content according to predetermined rules. A sniffer VM 250 is deployed to a host in cloud-based computing system 200 in much the same way that a tenant VM is deployed. In the embodiment shown, sniffer VM 250$_1$ is the corresponding network traffic monitor associated the first tenant organization and for any network traffic of a tenant port monitored by the first tenant organization, for example, traffic that is destined for tenant VM 172$_1$. In like manner, sniffer VM 250$_2$ is the corresponding network traffic monitor for a second tenant organization and for any network traffic of a tenant port monitored by the second tenant organization. It is understood that the isolation is maintained between the different sniffer VMs, thereby permitting multi-tenant traffic monitoring.

As shown in FIG. 2, VNIC 278 is connected to distributed virtual switch 290. Distributed virtual switch 290 performs a similar function as distributed virtual switch 270. That is, virtual machines connect to ports on distributed virtual switch 290 and distributed virtual switch 290 facilitates the transfer of data packets between the virtual machines. Distributed virtual switch 290 has a port on host 162$_2$, to which VNIC 278 is connected. Further, distributed virtual switch 290 has two ports on host 162$_3$, to which sniffer VMs 250$_1$ and 250$_2$ are communicatively connected. Distributed virtual switch 290 is comprised, in embodiments, of separate individual virtual switches (similar to virtual switch 270), each of which exists on a corresponding host 162. Hypervisors 216$_2$ and 216$_3$ jointly manage the ports allocated to distributed virtual switch 290.

Sniffer VMs 250$_1$ and 250$_2$ receive the data packets via a second distributed virtual switch 290. Sniffer VMs 250$_1$ and 250$_2$ execute packet analysis software, which are configured to provide content analysis, protocol analysis, and packet logging on Internet Protocol (IP) networks. In one embodiment, sniffer VMs 250$_1$ and 250$_2$ execute Snort®, which is open source network intrusion detection software, although any packet analysis software may be used, as the sniffer VMs are managed and administrated by the respective tenant organizations.

Further, it should be noted that the network path from decapsulator VM 240 to each of sniffer VMs 250$_1$ and 250$_2$ is unidirectional. That is, packets are transmitted from decapsulator VM 240 to each of the sniffer VMs, but no packets are transmitted from the sniffer VMs back to decapsulator VM 240. As previously mentioned, decapsulator VM 240 executes hidden from the tenant virtual machines. As sniffer VMs are logically associated with a corresponding tenant VM, the sniffer VMs are also kept isolated from decapsulator VM 240. Thus, VNIC 278 (which is the VNIC that transmits packets to the sniffer VMs) is not configured to receive any network traffic over distributed virtual switch 290.

In one or more embodiments, public cloud-based computing system 200 further includes a hybridity director 174. As previously mentioned, hybridity director 174 performs management functions for virtual machines instantiated in cloud-based computing system 200. In one or more embodiments, hybridity director 174 accesses cloud-computing system 200 over a management network that is separate from the network over which the tenant VMs 172 communicate. Hybridity director 174 typically includes an input/output device such as a keyboard and display) that a system administrator accesses in order to issue cloud management commands to manage the overall cloud environment. It should be noted that hybridity director 174 performs functions that are different from those performed by administrators of the various tenants. While tenant administrators are limited to managing only one or more corresponding tenant VMs (which does not affect other tenant VMs), hybridity director 174 manages the resources of cloud-computing system 200, which may affect all tenant VMs deployed in cloud-computing system 200.

For example, hybridity director 174 executes management software that instantiates tenant VMs, such as tenant VMs 172$_{1-3}$. In addition, a system administrator may use hybridity director 174 in order to instantiate a sniffer VM that corresponds to a particular tenant VM. For example, a system administrator may use hybridity director 174 to request monitoring of network data packets that are transmitted to tenant VM 172$_1$. According to one or more embodiments, hybridity director 174 instantiates sniffer VM $250_1$ in response to the request and obtains the network address of sniffer VM $250_1$. Hybridity director 174 then associates the network address of tenant VM $172_1$ with the network address of sniffer VM $250_1$, and maintains the association in a database. As described further below, decapsulator VM 240 uses this association between tenant VMs and corresponding sniffer VMs in order to transmit monitored network traffic to a corresponding sniffer VM.

In operation, when distributed virtual switch 270 receives a data packet for a monitored tenant VM (i.e., for a tenant VM that has a corresponding sniffer VM), distributed virtual switch 270 forwards a copy of the data packet to the tenant VM via a port on distributed virtual switch 270 to which the monitored tenant VM is connected. In addition, distributed virtual switch 270 directs the received data packet toward a tenant monitoring device (i.e., a sniffer VM). As previously mentioned, distributed virtual switch 270 may implement an ERSPAN source node. Typically, ERSPAN sources are configured to monitor a network source and forward traffic for the monitored source to a destination network address at which a monitoring device is installed. However, distributed virtual switch 270 intercepts data packets for multiple tenant VMs, each of which may be associated with a different sniffer VM. Therefore, in order for distributed virtual switch 270 to direct data packets to the correct sniffer VM, distributed virtual switch 270 encapsulates each intercepted packet and transmits the encapsulated packet through tunnel 274 to decapsulator VM 240.

Figure 3:
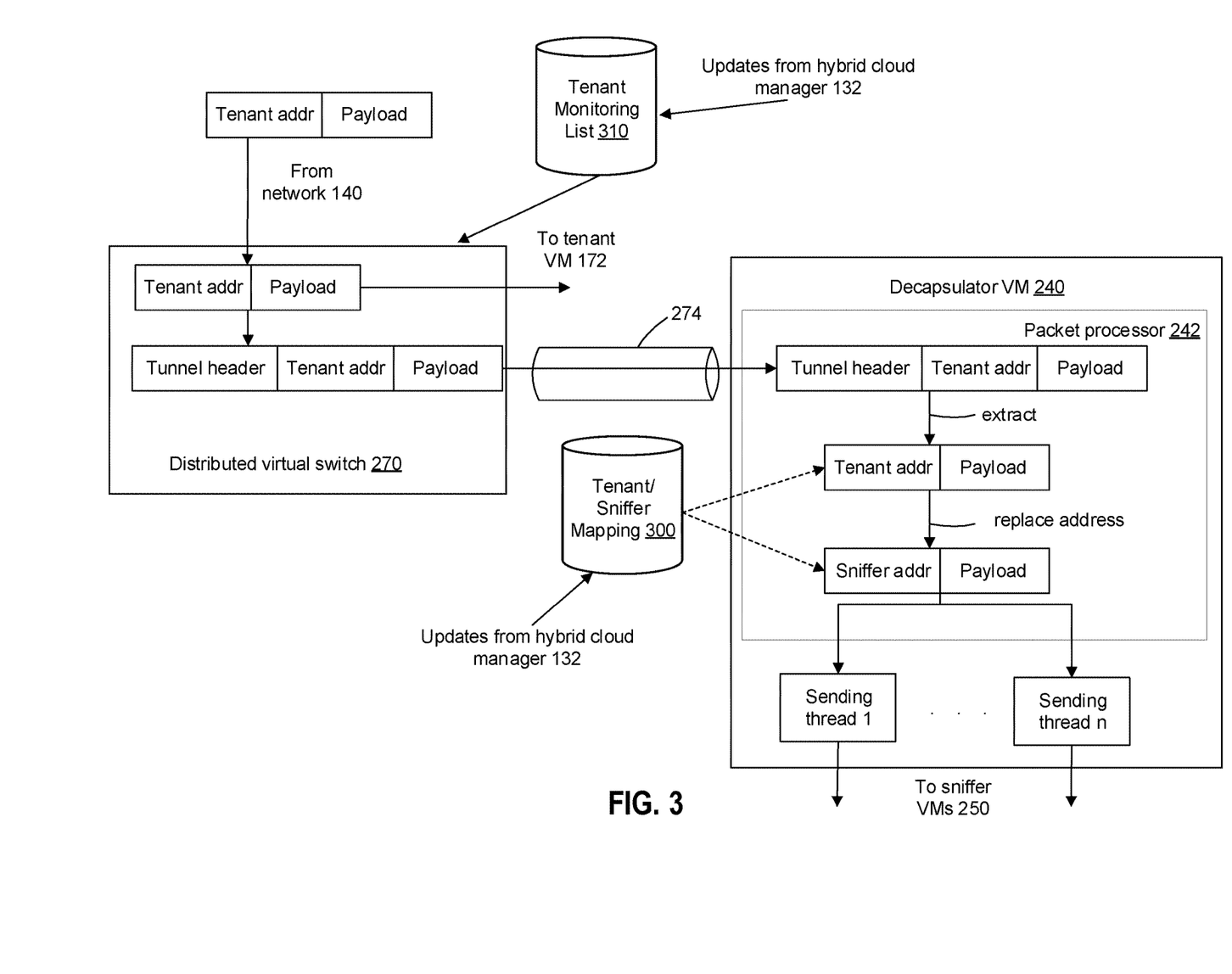
FIG. 3 is a conceptual diagram depicting components that facilitate monitoring of network traffic for public cloud-based tenants, according to one or more embodiments.

FIG. 3 is a conceptual diagram that depicts the operation of components of cloud-based computing system 200 that facilitate the monitoring of network traffic for tenant VMs, according to one or more embodiments. The components depicted include distributed virtual switch 270, decapsulator VM 240, and packet processor 242. As shown in the figure, distributed virtual switch 270 receives data packets from network 140, as was depicted in FIG. 2. FIG. 3 depicts distributed virtual switch 270 receiving one data packet from network 140. The received data packet is shown as comprising two parts: a first part (referred to as a packet header), which includes a tenant address (i.e., a network address for one of the tenant VMs 172 depicted in FIG. 2); and a second part, which comprises payload data. Payload data is the data that is carried on behalf of an application (i.e., data that is destined for one of the tenant VMs, or an application executing therein). In some cases, depending on the networking protocol used to transmit the data packet, payload data may be of variable length, up to some maximum length that is defined by the networking protocol. In other cases, the payload data may be of fixed length.

Distributed virtual switch 270, which monitors the ports of a distributed virtual switch to which tenant VMs connect, receives the data packet. After distributed virtual switch 270 receives the data packet, distributed virtual switch 270 sends a copy of the packet to the destination tenant VM, based upon the tenant address included in the packet header.

Distributed virtual switch 270 next makes a determination as to whether the destination tenant VM is to be monitored. In one or more embodiments, distributed virtual switch 270 makes this determination by reading a tenant monitoring database, such as tenant monitoring list 310. Tenant monitoring list 310 is, in some embodiments, a table that contains a row for each tenant VM. The index for each row is an identifier for a tenant VM, and the attribute for the identified tenant VM is a name-value pair that serves as an indicator as to whether monitoring of network data packets is to occur for the identified tenant VM. For example, tenant monitoring list 310 may store a row of data for tenant VM $172_1$ that comprises the following fields: a VM identifier for tenant VM $172_1$, followed by the name-value pair Monitor=Yes. Thus, when distributed virtual switch 270 receives a data packet for tenant VM $172_1$, distributed virtual switch 270 determines (based on the entry for tenant VM $172_1$ in tenant monitoring list 310) that data packets for tenant VM $172_1$ are to be monitored. On the other hand, tenant VM $172_3$ may have a corresponding entry in tenant monitoring list 310 that comprises the following fields: a VM identifier for tenant VM $172_3$, followed by the name-value pair Monitor=No. Thus, when distributed virtual switch 270 receives a data packet for tenant VM $172_3$, distributed virtual switch 270 determines (based on the aforementioned entry in tenant monitoring list 310 for tenant VM $172_3$) that data packets for tenant VM $172_3$ are not to be monitored.

As shown in FIG. 3, tenant monitoring list 310 is updated by hybridity director 174. When a tenant VM is created or instantiated, a corresponding entry for the tenant VM is stored in tenant monitoring list 310. By default, monitoring may be disabled for the newly instantiated VM (i.e., the name value pair for the tenant VM is set to Monitor=No). In one or more embodiments, a system administrator accesses hybridity director 174 and issues an instruction to enable monitoring for a tenant port of a tenant VM. When hybridity director 174 issues the instruction, the corresponding entry in tenant monitoring list 310 is updated (i.e., the name value pair for the tenant VM is set to Monitor=Yes). In some embodiments, hybridity director 174 enables monitoring for only a subset of virtual switch ports to which the tenant VM is connected.

When distributed virtual switch 270 receives a data packet and determines that the destination tenant VM is to be monitored, then packet capture module encapsulates the data packet in a "tunneling" packet, so that the packet may be transmitted through tunnel 285. In one embodiment, the received data packet is encapsulated according to the generic routing encapsulation (GRE) tunneling protocol, developed by Cisco Systems, Inc. As shown in FIG. 3, in order to encapsulate the received data packet, distributed virtual switch 270 appends the received data packet to a tunnel header. The tunnel header identifies the encapsulated packet as, for example, a GRE tunnel packet. When the encapsulated packet is so identified, then the encapsulated packet may be transmitted over a GRE tunnel, where endpoints for the tunnel recognize and process the encapsulated packet. For example, referring back to FIG. 2, VNIC 276, included in decapsulator VM 240, is an endpoint for tunnel 285.

Once the encapsulated packet is transmitted through tunnel 285 and received by decapsulator VM 240, packet processor 242 then extracts the originally transmitted data packet from the encapsulated data packet. This is shown conceptually in FIG. 3 by the arrow labeled extract, located within packet processor 242. However, the original data packet needs to be routed to the correct sniffer VM. That is, the data packet needs to be transmitted to the sniffer VM that corresponds to the original destination tenant VM that is being monitored. In order to accomplish this, packet processor 241 performs a lookup on a mapping table (referred to in FIG. 3 as tenant/sniffer mapping 300).

According to one or more embodiments, tenant/sniffer mapping 300 contains one or more entries for each tenant VM. The entry (or entries) for a tenant VM associate the network address of the tenant VM with the network address of the sniffer VM (or VMs) that correspond to the tenant VM.

As was mentioned previously, when hybridity director 174 turns on monitoring for a tenant VM, one or more sniffer VMs are (automatically) instantiated in cloud-based computing system 200. In the embodiment depicted in FIG. 2, for example, when monitoring is turned on for tenant VM 172$_1$, corresponding sniffer VM 250$_1$ is instantiated in cloud-based computing system 200. Specifically, sniffer VM 250$_1$ is instantiated on host 162$_3$ (although, it should be noted that sniffer VM 250$_1$ could have been instantiated on any of hosts 162 in cloud-based computing system 200). Similarly, when hybridity director 174 turns on monitoring for tenant VM 172$_2$, corresponding sniffer VM 250$_2$ is instantiated on host 162$_3$. Once hybridity director 174 instantiates sniffer VMs 250$_1$ and 250$_2$ on host 162$_3$, hybridity director 174 obtains the network addresses of each instantiated sniffer VM. Hybridity director 174 then associates the network address of the tenant VM with the network address of the corresponding instantiated sniffer VM.

Referring to FIG. 3, packet processor 242 accesses tenant/sniffer mapping 300 using the network address stored in the header of the originally transmitted data packet (i.e., the "tenant address"). Packet processor 242 then locates one or more network addresses for sniffer VMs that correspond to the tenant VM that is being monitored. After locating the one or more network addresses for the corresponding sniffer VMs, decapsulator VM 240 then replaces the tenant address in the header of the originally transmitted data packet with the located sniffer address. The arrow labeled replace address, depicted in FIG. 3, denotes this step. It should be noted that, if more than one sniffer VM corresponds to the monitored tenant VM, then packet processor 242 creates multiple copies of the originally transmitted data packet, one copy for each corresponding sniffer VM, and replaces the address in the header of each of the data packets. Then, each data packet may then be transmitted to an appropriate target sniffer VM.

As shown in FIG. 3, decapsulator VM 240 executes, in parallel, multiple sending threads. According to embodiments, when a sniffer VM is instantiated by hybridity director 174, hybridity director 174 informs decapsulator VM 240 of the network address of the instantiated sniffer VM. Decapsulator VM 240 then starts a sending thread that corresponds to the instantiated sniffer VM. Thus, when decapsulator VM 240 is ready to transmit a data packet to a particular sniffer VM, decapsulator VM 240 transfers the packet to a sending thread that corresponds to that sniffer VM. This enables data packets to be sent to sniffer VMs in a parallel manner, which increases throughput. For example, referring to FIG. 2, decapsulator VM 240 receives encapsulated data packets for monitored tenant VMs 172$_1$ and 172$_2$. According to the embodiment shown in FIG. 3, decapsulator VM 240 would execute a first sending thread corresponding to sniffer VM 250$_1$, and a second sending thread corresponding to sniffer VM 250$_2$. Since the sending threads execute in parallel, if decapsulator VM 240 first receives a large packet of data for tenant VM 172$_1$ and then receives a smaller data packet for tenant VM 172$_2$, decapsulator VM 240 immediately transfers each of the received data packets to a corresponding sending thread. That is, the large data packet is transferred to a sending thread that transmits to sniffer VM 250$_1$, while the smaller data packet is transferred to a sending thread that transmits to sniffer VM 250$_2$. Thus, it is possible for the smaller data packet destined for sniffer VM 250$_2$ to be transmitted without any delay resulting from the transmission of the larger packet to sniffer VM 250$_1$.

In further embodiments, decapsulator VM 240 may implement an internal queuing mechanism, which allows for the queuing of monitored data packets within the VM. This mechanism prevents the loss of monitored data packets in the event that a particular sniffer VM becomes unavailable, or when a connection between decapsulator VM 240 and a given sniffer VM experiences performance degradation.

Figure 4:
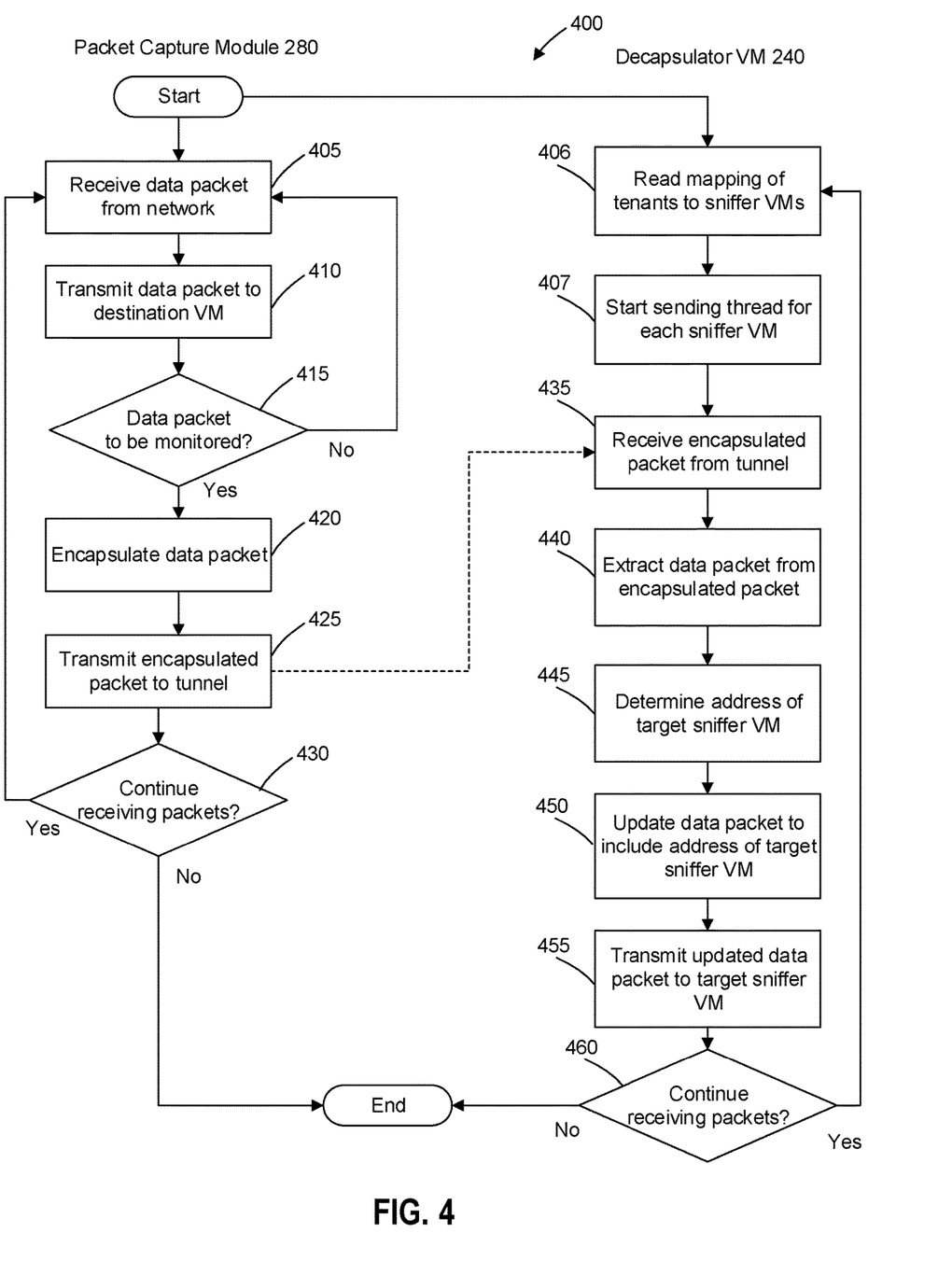
FIG. 4 is a flow diagram that depicts one embodiment of a method for receiving and routing data packets to public cloud-based monitoring devices, each monitoring device corresponding to a public cloud-based tenant.

FIG. 4 is a flow diagram that depicts a method 400 for receiving and routing data packets to cloud-based monitoring devices, where each monitoring device corresponds to a cloud-based tenant VM. As shown in FIG. 4, method 400 is performed cooperatively by a distributed virtual switch (such as distributed virtual switch 270 shown in FIGS. 2 and 3) and a decapsulator VM (such as packet processor 242 executing within decapsulator VM 240 shown in FIGS. 2 and 3). It should be noted that distributed virtual switch 270 and decapsulator VM 240 execute independently and in parallel with each other.

Method 400 begins at step 405, where distributed virtual switch 270 receives a data packet from the network (such as network 140 shown in FIG. 2). As was shown in FIG. 3, data packets consist of a header and a payload, where the header contains an address for a destination tenant VM. Next, at step 410, distributed virtual switch 270 transmits the received data packet to the destination tenant VM. According to embodiments, distributed virtual switch 270 carries out the transmission by transmitting the packet to a virtual switch to which the destination tenant VM is connected.

Next, at step 415, distributed virtual switch 270 determines whether or not the received data packet is to be monitored. As previously mentioned, in one or more embodiments, distributed virtual switch 270 makes this determination by performing a lookup on a tenant monitoring list, such as tenant monitoring list 310 shown in FIG. 3. If the tenant monitoring list indicates that the destination tenant VM has monitoring turned on, then distributed virtual switch 270 determines that the data packet is to be monitored, and method 400 proceeds to step 420. However, if the tenant monitoring list indicates that the destination tenant VM has monitoring turned off, then packet capture module determines that the data packet is not to be monitored. In this case, method 400 proceeds back to step 405, where distributed virtual switch 270 receives another data packet from network 140.

At step 420, after having determined that the received data packet is to be monitored, distributed virtual switch 270 encapsulates the received data packet. According to one or more embodiments, distributed virtual switch 270 appends the received data packet to a tunnel header, which is information that is recognized by network nodes that implement a tunneling protocol. As previously mentioned, one such tunneling protocol is Generic Routing Encapsulation (or GRE).

Once the received data packet is encapsulated, distributed virtual switch 270, at step 425, transmits the encapsulated packet to a tunnel. One example of such a tunnel is tunnel 274. As shown, tunnel 285 is a point-to-point tunnel that connects two end points (namely, distributed virtual switch 270 and decapsulator VM 240) within cloud-based computing system 200.

As previously mentioned, distributed virtual switch 270 and decapsulator VM 240 execute in parallel with each other. Thus, while packet capture module begins receiving data packets from network 140, decapsulator VM 240 executes initialization steps. At step 406, decapsulator VM 240 reads in a mapping table that maps network addresses of tenant VMs to network addresses of corresponding sniffer VMs. One example of such a mapping table is tenant/sniffer mapping 300, shown in FIG. 3. At step 407, decapsulator VM 240 starts a sending thread for each sniffer VM instantiated in cloud-based computing system 200. In some embodiments, decapsulator VM 240 determines that a sniffer VM has been instantiated after being informed of such instantiation by hybridity director 174. In other embodiments, decapsulator VM 240 determines each instantiated sniffer VM based upon the mapping information in tenant/sniffer mapping 300.

At step 435, decapsulator VM 240 receives an encapsulated packet from the tunnel. The received encapsulated packet is the packet that is transmitted by distributed virtual switch 270 at step 425. After receiving the encapsulated data packet, decapsulator VM 240, at step 440, extracts from the encapsulated data packet the data packet that was originally transmitted to the monitored tenant VM. As shown in FIG. 3, decapsulator VM 240 performs the extraction by reading the "payload" of the encapsulated data packet (i.e., the information that follows the tunnel header that was added by distributed virtual switch 270 at step 420).

Having extracted the originally transmitted data packet, decapsulator VM 240 determines, at step 445, the network address of one or more target sniffer VMs. As mentioned previously, decapsulator VM 240 determines the address of a target sniffer VM based on the mapping data stored in tenant/sniffer mapping 300. In embodiments, decapsulator VM 240 determines the network address of the monitored tenant VM from the header of the extracted data packet. Then, decapsulator VM 240 uses the network address of the monitored tenant VM to perform a lookup on the data read from tenant/sniffer mapping 300. Decapsulator VM 240 then locates the network address of one or more sniffer VMs that correspond to the monitored tenant VM.

Next, at step 450, decapsulator VM 240 updates the extracted data packet to include the network address of the target sniffer VM. Specifically, decapsulator VM updates the header of the extracted data packet, replacing the network address of the monitored tenant VM with the network address of the located target sniffer VM. It should be noted that, in the case where a monitored tenant VM has multiple corresponding sniffer VMs, decapsulator VM 240 makes a copy of the extracted data packet for each of the corresponding sniffer VMs, and replaces the network address in the header of each of the data packets to specify one of the corresponding sniffer VMs.

After updating the extracted data packet, decapsulator VM 240 transmits, at step 455, the updated packet to the target sniffer VM. According to one or more embodiments, decapsulator VM 240 transmits the updated packet by transferring the updated packet to a sender thread that corresponds to the target sniffer VM. Note that, at step 407, decapsulator VM 240 starts a sender thread for each target sniffer VM. After transferring the updated packet to the sender thread that corresponds to the target sniffer VM, the sender thread to which the updated packet was transferred proceeds to transmit the update packet to the target sniffer VM.

If decapsulator VM determines, at step 460, to continue to receive data packets over tunnel 285, then method 400 proceeds back to step 406, where decapsulator VM 240 re-reads the mapping information in tenant/sniffer mapping 300. The mapping data is re-read to capture any new sniffer VMs that were instantiated while decapsulator VM 240 executes. Further, when method 400 proceeds again to step 407, decapsulator VM 240 starts a sending thread corresponding to each newly instantiated sniffer VM.

However, if, at step 460, decapsulator VM 240 determines not to continue receiving data packets from tunnel 285, the portion of method 400 carried out by decapsulator VM 240 proceeds to terminate.

Referring back to step 425, the portion of method 400 carried out by distributed virtual switch 270 proceeds to step 430 once distributed virtual switch 270 transmits an encapsulated data packet to tunnel 285. At step 430, distributed virtual switch 270 determines whether or not to continue receiving data packets from network 140. If so, then method 400 proceeds back to step 405, where distributed virtual switch 270 receives a next data packet from network 140. However, if distributed virtual switch 270 is not to continue receiving data packets from network 140, then the portion of method 400 carried out by distributed virtual switch 270 proceeds to terminate.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operation system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

Although one or more embodiments have been described herein in some detail for clarity of understanding, it should be recognized that certain changes and modifications may be made without departing from the spirit of the disclosure. The various embodiments described herein may employ various computer-implemented operations involving data stored in computer systems. For example, these operations may require physical manipulation of physical quantities-usually, though not necessarily, these quantities may take the form of electrical or magnetic signals, where they or representations of them are capable of being stored, transferred, combined, compared, or otherwise manipulated. Further, such manipulations are often referred to in terms, such as producing, yielding, identifying, determining, or comparing. Any operations described herein that form part of one or more embodiments of the disclosure may be useful machine operations. In addition, one or more embodiments of the disclosure also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present disclosure may be implemented as one or more computer programs or as one or more computer program modules embodied in one or more computer readable media. The term computer readable medium refers to any data storage device that can store data which can thereafter be input to a computer system-computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present disclosure have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Many variations, modifications, additions, and improvements are possible. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method for monitoring network traffic in a cloud computing system, the method comprising:

receiving the network traffic at a first port of a distributed virtual switch associated with a target virtual machine (VM) executing in a first host computer in the cloud computing system, wherein the distributed virtual switch includes the first port and a second port, wherein the first port of the distributed virtual switch is located in the first host computer connected to the target VM executing in the first host computer and the second port of the distributed virtual switch is located in a second host computer connected to an intermediate VM executing in the second host computer;

transmitting the network traffic from the first port of the distributed virtual switch to the target VM executing in the first host computer and a copy of the network traffic from the first port associated with the target VM to a first network interface of the intermediate VM executing in the second host computer in the cloud computing system through the second port of the distributed switch associated with the intermediate VM via an encapsulated port mirroring session;

processing the copy of the network traffic at the intermediate VM to be routed to a traffic monitoring device, including decapsulating packets of the network traffic received via the encapsulated port mirroring session by the intermediate VM; and forwarding the decapsulated packets of the network traffic from a second network interface of the intermediate VM to the traffic monitoring device through a second distributed virtual switch that connects the second host computer to a third host computer, which includes the traffic monitoring device, wherein the second network interface of the intermediate VM is not configured to receive any network traffic over the second distributed virtual switch.

2. The method of claim 1, wherein transmitting the copy of the network traffic includes transmitting the copy of the network traffic through a tunnel across the distributed virtual switch that supports point-to-point transmission of encapsulated data.

3. The method of claim 2, wherein transmitting the copy of the network traffic includes encapsulating the copy of the network traffic with a tunnel header as encapsulated network traffic to transmit the copy of the network traffic through the tunnel across the distributed virtual switch to the first network interface of the intermediate VM.

4. The method of claim 3, wherein the port mirroring session comprises an Encapsulated Remote Switched Port Analyzer (ERSPAN) session configured to encapsulate captured Layer-2 network traffic at the first port of the distributed virtual switch using Layer-3 packets.

5. The method of claim 1, wherein processing the copy of the network traffic at the intermediate VM includes adding an address of the traffic networking device to the decapsulated packets of the network traffic to forward the network traffic to the traffic network device.

6. A non-transitory computer-readable medium containing program instructions for monitoring network traffic in a cloud computing system, wherein execution of the program instructions by one or more processors of at least one computer systems causes the one or more processors to perform steps comprising:

receiving the network traffic at a first port of a distributed virtual switch associated with a target virtual machine (VM) executing in a first host computer in the cloud computing system, wherein the distributed virtual switch includes the first port and a second port, wherein the first port of the distributed virtual switch is located in the first host computer connected to the target VM executing in the first host computer and the second port of the distributed virtual switch is located in a second host computer connected to an intermediate VM executing in the second host computer;

transmitting the network traffic from the first port of the distributed virtual switch to the target VM executing in the first host computer and a copy of the network traffic from the first port associated with the target VM to a first network interface of the intermediate VM executing in the second host computer in the cloud computing system through the second port of the distributed virtual switch associated with the intermediate VM via an encapsulated port mirroring session;

processing the copy of the network traffic at the intermediate VM to be routed to a traffic monitoring device, including decapsulating packets of the network traffic received via the encapsulated port mirroring session by the intermediate VM; and forwarding the decapsulated packets of the network traffic from a second network interface of the intermediate VM to the traffic monitoring device through a second distributed virtual switch that connects the second host computer to a third host computer, which includes the traffic monitoring device, wherein the second network interface of the intermediate VM is not configured to receive any network traffic over the second distributed virtual switch.

7. The computer-readable medium of claim 6, wherein transmitting the copy of the network traffic includes transmitting the copy of the network traffic through a tunnel across the distributed virtual switch that supports point-to-point transmission of encapsulated data.

8. The computer-readable medium of claim 7, wherein transmitting the copy of the network traffic includes encapsulating the copy of the network traffic with a tunnel header as encapsulated network traffic to transmit the copy of the network traffic through the tunnel across the distributed virtual switch to the first network interface of the intermediate VM.

9. The computer-readable medium of claim 8, wherein the port mirroring session comprises an Encapsulated Remote Switched Port Analyzer (ERSPAN) session configured to encapsulate captured Layer-2 network traffic at the first port of the distributed virtual switch using Layer-3 packets.

10. The computer-readable medium of claim 6, wherein processing the copy of the network traffic at the intermediate VM includes adding an address of the traffic networking device to the decapsulated packets of the network traffic to forward the network traffic to the traffic network device.

11. A cloud computing system, comprising:
a plurality of host computers with hardware resources;
a target virtual machine (VM) executing on a first host computer and an intermediate VM with first and second network interfaces executing on a second host computer;
a traffic monitoring device; and
a distributed virtual switch supported by the plurality of host computers, wherein the distributed virtual switch includes a first port and a second port, wherein the first port of the distributed virtual switch is located in the first host computer connected to the target VM executing in the first host computer and the second port of the distributed virtual switch is located in the second host computer connected to the intermediate VM executing in the second host computer, the distributed virtual switch being configured to receive network traffic at the first port associated with the target virtual machine (VM), and transmit the network traffic from the first port of the distributed virtual switch to the target VM executing in the first host computer and a copy of the network traffic from the first port associated with the target VM to the first network interface of the intermediate VM executing in the second host computer through the second port of the distributed switch associated with the intermediate VM via an encapsulated port mirroring session,
wherein the intermediate VM is configured to process the received copy of the network traffic to be routed to the traffic monitoring device that includes decapsulating packets of the network traffic received via the encapsulated port mirroring session and to forward the decapsulated packets of the network traffic through the second network interface of the intermediate VM to the traffic monitoring device through a second distributed virtual switch that connects the second host computer to a third host computer, which includes the traffic monitoring device, wherein the second network interface of the intermediate VM is not configured to receive any network traffic over the second distributed virtual switch.

12. The system of claim 11, wherein the distributed virtual switch is configured to transmit the copy of the network traffic through a tunnel across the distributed virtual switch that supports point-to-point transmission of encapsulated data.

13. The system 12, wherein the distributed virtual switch is configured to encapsulate the copy of the network traffic with a tunnel header as encapsulated network traffic to transmit the copy of the network traffic through the tunnel across the distributed virtual switch to the first network interface of the intermediate VM.

14. The system 11, wherein the intermediate VM is configured to add an address of the traffic networking device to the decapsulated packets of the network traffic to forward the network traffic to the traffic network device.

* * * * *